United States Patent [19]

Pein

[11] Patent Number: 5,267,081
[45] Date of Patent: Nov. 30, 1993

[54] REARVIEW MIRROR

[75] Inventor: Andreas Pein, Alfeld, Fed. Rep. of Germany

[73] Assignee: Deutsche Spezialglas AG, Grünenplan, Fed. Rep. of Germany

[21] Appl. No.: 630,995

[22] Filed: Dec. 19, 1990

[30] Foreign Application Priority Data

Dec. 19, 1989 [DE] Fed. Rep. of Germany ....... 3941859

[51] Int. Cl.$^5$ .................. G02B 5/28; B60R 1/08
[52] U.S. Cl. .................. 359/584; 359/585; 359/586; 359/588; 359/589; 359/884
[58] Field of Search ............... 350/164, 166, 277, 278, 350/641, 642; 359/584, 585, 586, 587, 588, 589, 884, 883

[56] References Cited

U.S. PATENT DOCUMENTS

| 4,451,119 | 5/1984 | Meyers et al. | 350/641 |
| 4,673,248 | 6/1987 | Taguchi et al. | 350/166 |
| 4,793,669 | 12/1988 | Perilloux | 359/589 |
| 4,805,989 | 2/1989 | Nakajima | 350/642 |
| 4,846,551 | 7/1989 | Rancourt et al. | 359/589 |
| 4,921,331 | 5/1990 | Nakajima | 350/278 |
| 4,944,581 | 7/1990 | Ichikawa | 350/642 |
| 4,955,705 | 9/1990 | Nakajima et al. | 350/642 |
| 4,979,802 | 12/1990 | Ichikawa | 359/584 |

FOREIGN PATENT DOCUMENTS

| 0176935 | 4/1986 | European Pat. Off. |
| 1036672 | 11/1955 | Fed. Rep. of Germany . |
| 2449763 | 9/1976 | Fed. Rep. of Germany . |
| 3436016 | 4/1986 | Fed. Rep. of Germany . |
| 3436011 | 5/1986 | Fed. Rep. of Germany . |
| 3731501 | 5/1988 | Fed. Rep. of Germany . |
| 3744312 | 9/1988 | Fed. Rep. of Germany . |
| 3728100 | 3/1989 | Fed. Rep. of Germany . |
| 3941859 | 12/1989 | Fed. Rep. of Germany . |
| 2635530 | 2/1990 | France . |
| 60-212704 | 10/1985 | Japan | 350/642 |
| 0178603 | 7/1990 | Japan | 359/884 |

OTHER PUBLICATIONS

*Glass, Science and Technology*, Uhlmann and Kreidl, vol. 2 1984 pp. 267–274.

Primary Examiner—Bruce Y. Arnold
Assistant Examiner—R. D. Shafer
Attorney, Agent, or Firm—Millen, White, Zelano & Branigan

[57] ABSTRACT

A rearview mirror suitable for vehicles, especially motor vehicles, is composed of a transparent substrate, preferably of soda silica glass and a rear reflection coating comprising a metal mirror layer, preferably chromium, and a dielectric triple interference layer system placed between the metal mirror layer and the transparent substrate. The triple interference layer system comprises, in contact with the metal layer, a dielectric layer having a high refractive index, e.g., titanium dioxide, a next layer having a low refractive index, e.g., silicon dioxide, and next a dielectric layer having a medium refractive index, e.g., a mixed $TiO_2$ and $SiO_2$ layer. With the selection of suitable layer thicknesses, a total reflection of at least 40% and a blue reflection tint, independent of the viewing angle, are attained.

16 Claims, 2 Drawing Sheets

REARVIEW MIRROR

BACKGROUND OF THE INVENTION

The invention relates to an improved rearview mirror suitable for vehicles, especially motor vehicles, and particularly to the type of rearview mirror that contains a plurality of interference layers between the substrate glass and the metallic layer.

It is known that suitable reflection layers for such rearview mirrors comprise coatings having a total reflection which is not excessive, but is at least 40% according to an EC guideline, and which further exhibit a marked blue reflection tint. Such reflection layers have glare-reducing properties, owing to: on the one hand, reduced total reflection, e.g., in comparison with silver or aluminum, and, on the other hand, the fact that the headlight beam, because of its rather low color temperature, exhibits an emission spectrum shifted to the yellow range, which spectrum of light is reflected by such reflection layers less strongly than daylight. Such coatings (layers) can be applied both to the front surface and to the rear of a transparent substrate, the latter in most cases being a soda silica glass.

Thus, there are known rearview mirrors coated on the front surface, having a reflection layer consisting of three dielectric individual layers of about $\lambda/4$ thickness each ($\lambda$ about 450 nm), with the outside two layers exhibiting high refractive index, and the middle layer a low refractive index. Because of the light transmission of the dielectric layers, the rear surface of such a mirror is provided in most cases with a dark, absorbing coating (DE-AS 1036672, DE-AS 2449763).

Further, front surface mirrors are known, which, besides a metal layer with 55 to 85% total reflection lying directly on the substrate, also have a dielectric layer with high refractive index and about $\lambda/2$ thickness ($\lambda$ about 450 nm). By such an additional interference layer, the original neutral reflection tint of the metal layer is converted into a blue tint. Since the metal layer is largely opaque on the front surface, the abovementioned rear surface dark coating can be dispensed with in such a mirror (DE-OS 37 28 100).

Such front surface mirrors, as is known, have the advantage of a reflection absolutely free of a double image, but at the same time exhibit the drawback that the thin reflection coating, in most cases only a few hundred nm, is exposed unprotected to outside mechanical and chemical attacks. As a result, a premature wearing of this coating often occurs, and the mirrors become useless.

On the other hand, rearview mirrors, coated on the rear surface, with a blue reflection tint are also known, in the form of three different coating types.

In the first type, a dielectric layer with high refractive index and about $\lambda/2$ thickness ($\lambda$ about 450 nm) is located directly on the substrate rear surface. Next, a metal layer with 60 to 80% total reflection follows and then optionally another protective layer. Just as in the front surface mirror described above, here also the originally neutral reflection tint of the metal layer is converted by an additional interference layer into a blue tint. But in the rear surface mirror, the $\lambda/2$ layer is adjacent to the substrate glass and not adjacent to the air as in the above-described front surface mirror. As a result this interface loses optical efficiency so that such a rear surface mirror exhibits only a relatively weak blue reflection tint. Further, this blue tint is achieved only by a reduction of the reflection in the long-wave visible spectral region. Therefore, the total reflection of such a rear surface mirror is clearly decreased by the incorporation of a blue reflection tint, so that the requirement for at least 40% total reflection possibly can no longer be met. This drawback can be avoided only by the use of materials having an extremely high refractive index, greater than 2.5, for the production of the $\lambda/2$ layer. But such materials, as, e.g., zinc sulfide, are chemically not very stable and can be applied only by a rather complex vaporization process. The just described mirror type does have the advantage, however, that the metal layer, e.g., can consist of chemically resistant chromium so that a rear protective coating is not necessary, but the disadvantages of this mirror type are a faint blue reflection tint and a simultaneously low total reflection (DE-PS 3436016 Cl).

In the second type, a very thin, partially translucent metal layer is located directly on the substrate rear surface; next, a dielectric layer with about $\lambda/4$ thickness ($\lambda$ about 750 nm) follows: then a metal layer again follows, but which is relatively thick and exhibits greater than a 90% total reflection. The refractive index of the dielectric layer of this mirror type is of no importance since it functions merely to bring about only a certain distance between the two metal layers, between which the interference phenomena occur. The metal layer, just described, having a high total reflection consists either of silver or aluminum, but both metals, because of their slight chemical resistance, must be provided with protective layers. Even so, especially in the case of silver, such protective layers are often not sufficient, resulting in an eventual attack and deterioration of the metals. On the other hand, the use of a highly reflective metal in the case of the just described mirror type is absolutely necessary; otherwise, the total reflection of the layer system does not exceed 40%. While with this mirror type, it is thus advantageously possible to achieve a marked blue reflection tint with sufficient total reflection, there is still a considerable drawback in using a highly reflective metal sensitive to chemical attack such as, e.g., silver (DE-PS 34 36 011 Cl).

In the third type there is also provided between the substrate and a metal layer with 50 to 80% total reflection a system of three dielectric interference layers, but which consist only of materials with high as well as low refractive indices. Here a layer with high refractive index and about $\lambda/4$ thickness ($\lambda$ about 470 nm) is located directly on the substrate rear surface, then a layer with low refractive index and about $\lambda/4$ thickness follows and then again a layer follows with a high refractive index, but about $\lambda/2$ thickness. Finally, the previously mentioned metal layer follows. The disadvantage of this layer system is in the choice of materials with high refractive index for the layer resting on the substrate. As a result, it is hardly possible to achieve a blue reflection tint and at the same time a total reflection of greater than 40%. Further, such a layer system exhibits not only the desired reflection maximum at about 450 nm, but also has a very marked reflection minimum at about 650 nm, so that here the spectral reflection again increases above 650 nm. But generally, at an acute-angled view of the interference layer system, such reflection maxima and minima move to shorter wavelengths, and that means in the case of this layer system, an undesirable change of the reflection tint to the reddish (JP-OS 602 127 04).

SUMMARY OF THE INVENTION

An object of the invention is to provide a rearview mirror suitable for vehicles, especially motor vehicles, having a reflection coating protected from external chemical and mechanical attack, and which moreover shows a total reflection of at least 40% as well as a marked blue reflection tint largely independent of the viewing angle.

Upon further study of the specification and appended claims, further objects and advantages of this invention will become apparent to those skilled in the art.

To attain these objects, there is provided a rearview mirror according to the invention, wherein the interference system, placed between the transparent substrate and the metallic reflection layer, comprises three dielectric layers, of which the first layer, located directly on the transparent substrate, exhibits a medium refractive index, the next second layer exhibits a lower refractive index than the medium refractive index and the third layer, next to the second layer, exhibits a higher refractive index than the medium refractive index. The thickness of the layers is dimensioned so that the rearview mirror, in a top view of the substrate side, shows a total reflection of at least 40% and a marked blue reflection tint.

The above-described triple interference layer system, in cooperation with the metal layer, causes not only a reduction of the reflection in the long-wave visible spectral region but also an increase of the reflection in the shortwave blue range. This is achieved, in particular, by the use of materials having a medium refractive index for the first of the three interference layers located on the transparent substrate. As a result, it is surprisingly possible to achieve a pronounced blue reflection tint, independent of the viewing angle, as well as a sufficient total reflection, but at the same time not requiring a metal, such as silver, that is highly reflective and sensitive to chemical attack. The triple interference layer above all makes possible the use of a metal layer with only 50-80% total reflection as the last optically active layer, without there being a danger of a lowering of the total reflection to below 40%.

Especially high reflection values with a reflection maximum in the blue are then achieved, if the first layer adjacent to the transparent substrate exhibits a refractive index of 1.6-1.85 and a layer thickness of 40-80 nm, the next second layer exhibits a refractive index less than 1.5 and a layer thickness of 60-120 nm and the third layer, following the second layer, exhibits a refractive index greater than 1.9 and a layer thickness of 70-140 nm.

If the total thickness of the layers thicknesses is lowered below the above-indicated limit, i.e., below 170 nm, the reflection maximum in the first case moves into the shortwave spectral region, resulting in a more intensive blue reflection tint, which is accompanied by a lowering of the total reflection. If the total thickness is increased to above the limit of 340 nm, the maximum moves into the long-wave spectral region, so that the mirror gets an undesirable yellow reflection tint. In the same way, the interference optical effect with the change of the individual layer thicknesses is altered if the indicated limits are not observed.

Since for the interference optical effect of the layer system, the optical path of the light, which results from the product of the geometric path and refractive index, is decisive, similar considerations can also be used for deviations of the refractive indices from the above-named regions.

Especially preferred is a triple interference layer system in which the first layer, adjacent to the transparent substrate, exhibits a refractive index of 1.7 and a layer thickness of about 60 nm, the next second layer exhibits a refractive index of 1.45 and a layer thickness of about 95 nm and the third layer, following it, exhibits a refractive index of 2.05 and a layer thickness of about 105 nm. With such a layer system, a total reflection of up to 50% can be achieved with a suitable metal mirror layer, without the blue reflection tint being impaired. Small production-caused deviations from the above-named layer thicknesses (such deviations being unavoidable especially in the coating of large areas) in this case still does not lead to any deterioration of the reflection properties of the mirror according to the invention.

Since the reflection coating is located on the rear of the rearview mirror in a way known in the art, it is well protected from outside chemical and mechanical attacks. Suitable metals for the metal mirror layer are especially chromium, zinc, tin or nickel or alloys of aluminum-copper, nickel-copper, tin-copper or iron-chromium-nickel. Applied in a sufficient thickness, the layers made from these metals show the desired total reflection of 50-80%.

The thickness of the metal layer is generally dimensioned so that, on the one hand, troublesome transmission as well as too small a reflection, caused by too small a thickness, is avoided. For this reason, a minimum layer thickness of 30 nm is necessary. But, on the other hand, the coating should also be inexpensive, which means that the layer thickness should not be unnecessarily increased. With the use of chromium for the metal layer, which is especially preferred because of its high chemical resistance, at a layer thickness of about 45 nm, a marked blue reflection tint as well as a total reflection of 45 to 50% can be achieved.

Besides silicate glass and other glasses, transparent materials made from plastic such as, e.g., polymethylmethacrylate, etc., can be used as the transparent substrate. The geometry of the substrate surface can be either plane or slightly curved.

A great number of dielectric materials are suitable for the dielectric interference layers, provided they are largely absorption-free in the visible spectral region so that no additional undesirable light attenuation is caused. For highly refractive layers, e.g., the oxides of titanium, cerium, tin, zirconium or mixtures of these oxides are preferred. For layers with low refractive index, e.g., silicon dioxide or magnesium fluoride known from the evaporation coating technique or other fluorides are suitable.

The interference layers with medium refractive index are preferably mixed layers of metal oxides with high and low refractive index, e.g., of $TiO_2$ and $SiO_2$, the ratio of these components being selected in order to result in the desired medium refractive index.

Processes for application of the layers to the transparent substrate are known in the art. With the rearview mirror according to the invention, first the triple interference layer system is applied by the dipping process wherein there are employed alcoholic solutions of organic compounds of the metals whose oxides are to form the interference layers. Mixtures of the corresponding solutions are used for the production of mixed layers from different metal oxides.

In the dipping process, for the application of a layer, the transparent substrate, wetted with the appropriate solution, is subjected to an annealing process, and the dielectric layer is formed on the wet surface from the appropriate metal oxide(s).

The dipping process is especially suitable for this purpose, since it allows for an inexpensive coating of large-surface substrates with dielectric materials, which is not easily possible with the vacuum processes. Therefore, the use of vacuum processes to apply the dielectric layers is generally recommended when smaller surfaces are to be coated. As vacuum processes, there are especially suitable: direct vaporization or cathode sputtering of the appropriate dielectric materials, or reactive vaporization or reactive cathode sputtering of the appropriate metals.

With the dipping process, there are preferably deposited dielectric layers of oxides of silicon, titanium, cerium, tin or zirconium or mixtures of these oxides.

The metal mirror layer, following the triple interference layer system, for example from chromium, is preferably applied with a vacuum process, e.g., by magnetron cathode sputtering. Besides vaporization, other deposition processes can be used, e.g., wet chemical processes.

To improve the resistance to chemical and mechanical attacks, it is advisable to apply a protective layer, e.g., of a varnish, to the rear of the reflection coating.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF DRAWINGS

Figure 1:
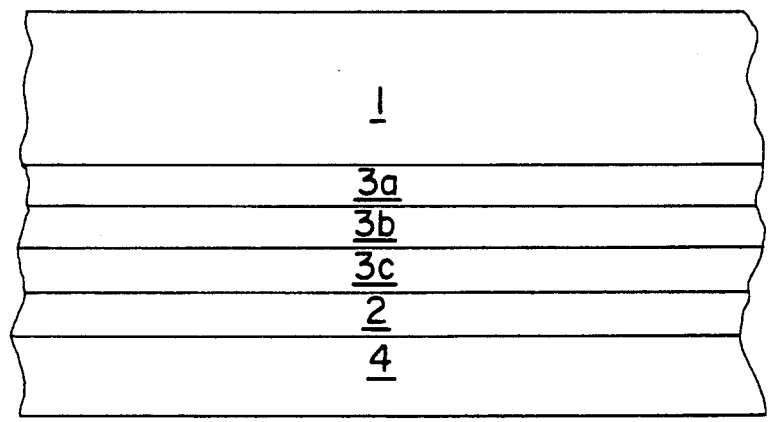
FIG. 1 is a diagrammatic longitudinal representation of a rearview mirror according to the invention.

FIG. 1 shows a transparent substrate (1) on whose rear is located the triple interference layer system, consisting of a first dielectric layer with medium refractive index (3a), a second dielectric layer with low refractive index (3b) and a third dielectric layer with high refractive index (3c). This dielectric layer system (3a–3c) is followed by a metal reflection layer (2), to which additionally a protective layer (4) can be applied. (The dimensions of the mirror, especially the layer thicknesses are not drawn to scale.)

Without further elaboration, it is believed that one skilled in the art can, using the preceding description, utilize the present invention to its fullest extent. The following preferred specific embodiment is, therefore, to be construed as merely illustrative, and not limitative of the remainder of the disclosure in any way whatsoever.

The entire disclosures of all applications, patents and publications, if any, cited above and below, and of corresponding application German P 39 41 859, filed Dec. 19, 1989, are hereby incorporated by reference.

EXAMPLE

An $SiO_2/TiO_2$ mixture layer with a refractive index of 1.7 and layer thickness of about 60 nm, an $SiO_2$ layer with a refractive index of 1.45 and a layer thickness of about 95 nm and a $TiO_2$ layer with a refractive index of 2.05 and a layer thickness of about 105 nm were successively applied to the plane surface of a transparent substrate of 2 mm thickness made of soda silica glass. The dipping process was conventional, using a dipping solution forming $SiO_2$ or $TiO_2$ and a mixture of the two solutions in a weight ratio $SiO_2/TiO_2=0.9$. Then a chromium layer, about 45 nm thick, was applied to the triple interference layer system by a conventional vacuum process. The same process was repeated with a transparent substrate having a curved surface.

Figure 2:
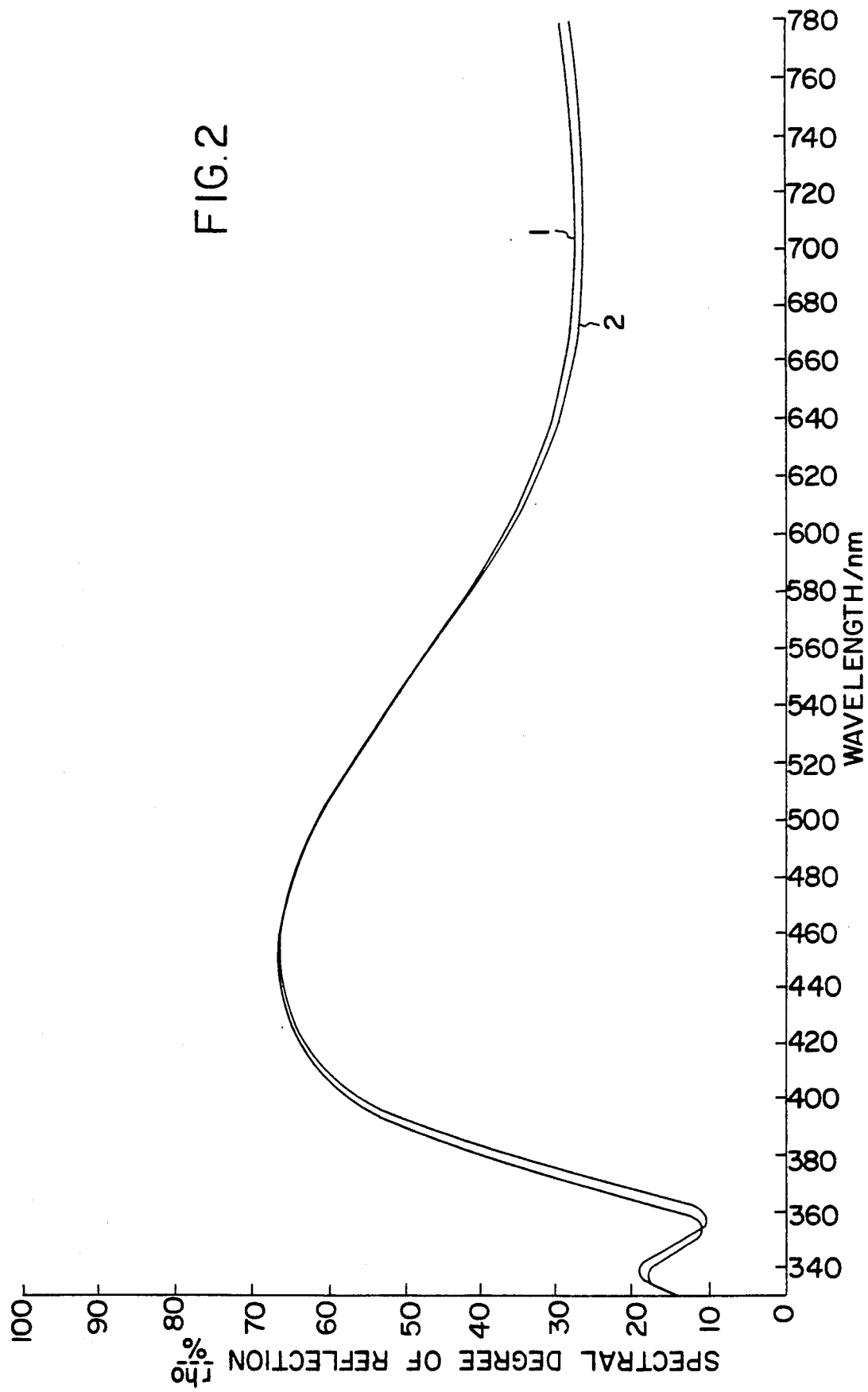
FIG. 2 is a graph representing the degree of reflection as a function of wavelength of a rearview mirror according to the invention with (1) a plane transparent substrate and (2) a curved transparent substrate.

On the coated disks, the shape of the degree of reflection was measured from the glass side with an incidence of rays at an angle of 25° to the surface normal of the reflection mirror in the visible spectral region. Curves 1 or 2 in FIG. 2 show the spectral shape of the degree of reflection for the curved and plane mirror.

Both curves are substantially identical. A maximum at about 460 nm is followed by the continuous decrease of the degree of reflection from the short-wave to long-wave region necessary for glare-free viewing. Both mirrors exhibit a total reflection of about 44%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a rearview mirror suitable for vehicles comprising a transparent substrate, a rear reflection coating of a metal layer yielding 50–80% total reflection, measured on the surface against air, and a plurality of dielectric interference layers having different refractive indices located between the transparent substrate and the metal layer, the improvement which comprises an interference layer system between the transparent substrate and the metal layer, said interference layer system consisting of only three dielectric interference layers: a first interference layer (3a), supported directly on the transparent substrate (1), said first layer having a medium refractive index of 1.6 to 1.85, a following second interference layer (3b) having a refractive index lower than the first layer and a following third interference layer (3c) having a refractive index higher than the first layer, said third layer being in face-to-face contact with the rear reflection coating, the thicknesses of the dielectric layers being dimensioned so that the rearview mirror exhibits a total reflection of at least 40% and a blue reflection tint.

2. A rearview mirror according to claim 1, wherein the first dielectric layer (3a) has a layer thickness of 40 to 80 nm, the second dielectric layer (3b) has a refractive index less than 1.5 and a layer thickness of 60 to 120 nm, and the third dielectric layer (3c) has a refractive index greater than 1.9 and a layer thickness of 70 to 140 nm.

3. A rearview mirror according to claim 2, wherein the metal layer (2) is selected from the group consisting of chromium, zinc, tin, nickel, an alloy of aluminum-copper, nickel-copper, tin-copper and iron-chromium-nickel.

4. A rearview mirror according to claim 3, wherein the metal layer (2) has a thickness of at least 30 nm.

5. A rearview mirror according to claim 2, wherein the metal layer (2) is having a thickness of about 45 nm.

6. A rearview mirror according to claim 1, wherein the metal layer (2) is selected from the group consisting of chromium, zinc, tin, nickel, an alloy of aluminum-copper, nickel-copper, tin-copper and iron-chromium-nickel.

7. A rearview mirror according to claim 6, wherein the metal layer (2) ha a thickness of at least 30 nm.

8. A rearview mirror according to claim 1, wherein the first layer (3a), has a refractive index of 1.7 and a layer thickness of about 60 nm, the second layer (3b) has a refractive index of 1.45 and a layer thickness of about 95 nm, and the third layer (3c) has a refractive index of 2.05 and a layer thickness of about 105 nm.

9. A rearview mirror according to claim 8, wherein the metal layer (2) is chromium having a thickness of about 45 nm.

10. A rearview mirror according to claim 9, wherein metal layer (2) is superimposed by a protective layer (4).

11. A rearview mirror according to claim 1, wherein the interference layers (3a-c) are applied by a dipping process, with the use of alcoholic solutions of organo-metallic compounds of silicon, titanium, cerium, tin or zirconium or of mixtures of such solutions.

12. A rearview mirror according to claim 11, wherein at least one of the interference layers (3a-c) is applied by a vacuum process.

13. A rearview mirror according to claim 12, wherein the metal layer (2) is applied with a vacuum process.

14. A rearview mirror according to claim 1, wherein the metal layer (2) has a thickness of at least 30 nm.

15. A rearview mirror according to claim 1, wherein the metal layer (2) is chromium having a thickness of about 45 nm.

16. A rearview mirror according to claim 1, wherein metal layer (2) is superimposed by a protective layer (4).

* * * * *